July 1, 1969 SADAO ISHIKAWA 3,452,959

COMBINATIONAL PLASTIC HANGER-BOARD CONSTRUCTION

Filed Aug. 31, 1967

INVENTOR
SADAO ISHIKAWA
BY Mason, Fenwick & Lawrence
ATTORNEYS

INVENTOR
SADAO ISHIKAWA
BY Mason, Fenwick & Lawrence
ATTORNEYS

United States Patent Office 3,452,959
Patented July 1, 1969

3,452,959
COMBINATIONAL PLASTIC HANGER-BOARD CONSTRUCTION
Sadao Ishikawa, 18-7, 1-chome, Hakusan, Bunkyo-ku, Tokyo, Japan
Filed Aug. 31, 1967, Ser. No. 664,696
Int. Cl. A47g *1/04;* A47f *7/14*
U.S. Cl. 248—488
6 Claims

ABSTRACT OF THE DISCLOSURE

A peg type board construction formed of plastic component boards having edge connectors connectable to provide a resultant board of desired shape and size and including interior support lugs engaging a supporting surface to prevent board deflection.

Background of the invention

It has been the practice in the past to provide hanger or peg boards of plywood in which thin veneers of thin wood are bonded adhesively with the grain of adjacent sheets oriented in perpendicular arrangement. Boards of this type are formed of adhesively bonded sawdust or other minute particles which are bonded together. All such boards of this type are provided a plurality of perforations generally arranged in equidistant spaced array across the entire surface of the board.

Hangerboards of this sort are generally treated with paint, varnish or the like providing a waterproof surface. However, such surface treatment has not proven satisfactory in prevention of warping or paint flaking particularly in cases where the board is subjected to contact with water or is employed in a humid atmosphere for a long period. Therefore, hangerboards constructed of wood or the like have proven to be unsatisfactory in a number of environmental conditions in which they are employed.

Other defects of the known forms of hangerboard construction reside in the tendency of the flue joints and adhesive bonding to deteriorate in time and from the fact that the process of painting the boards to achieve a desired color is quite tedious in the area adjacent the perforations.

Summary of the invention

This invention, as explained in complete detail hereinafter, consists of a hanger or peg board construction formed entirely of molded plastic material with each board having connectable edge portions so that plural boards can be connected to provide a resultant hangerboard construction of desired size and shape. Therefore, each individual user can arrange the boards in any desired manner by coupling the pieces together in accordance with the wishes of the user. Moreover, the common hardware employed with the known forms of hangerboards is usable with the hangerboard of this invention in the manner previously employed. A large variety of shapes for the boards can be provided in order to enhance the versatility of function.

Description of the preferred embodiment

Figure 1:
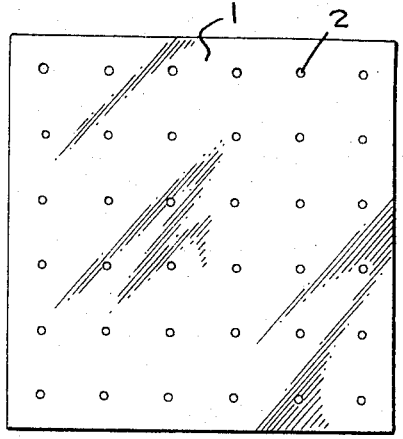
FIGURE 1 is a front view of the preferred embodiment of the invention oriented in a manner assumed when mounted upon a vertical wall.
Figure 3:
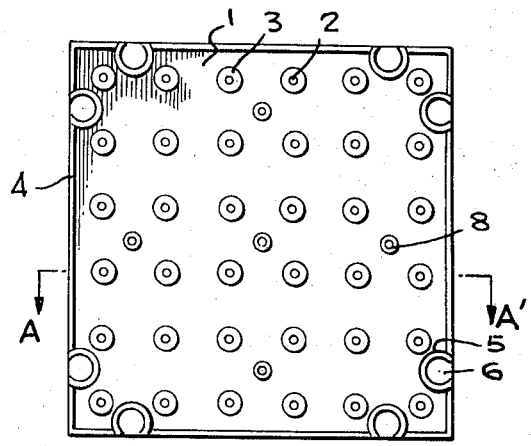
FIGURE 3 is a rear view of the embodiment of FIGURE 1.
Figure 2:
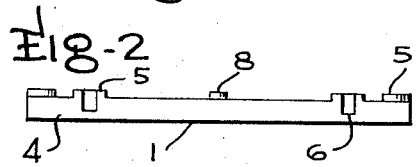
FIGURE 2 is a top view looking downward on the embodiment of FIGURE 1.
Figure 5:
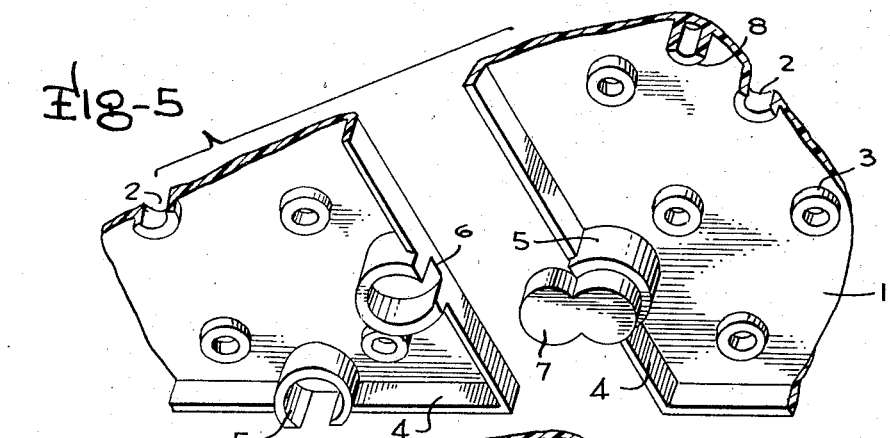
FIGURE 5 is an enlarged perspective view illustrating a first mode of connection between adjacent boards.

This invention comprises a hanger or peg board 1 which is formed of styrol resin, ABS resin, AS resin, propylene, acryl resin, hard polyethylene, vinyl resin or other suitably hard thermoplastic resin having the desired strength and molding qualtities necessary for construction of this type. The board 1 is molded in any suitable manner and includes a plurality of perforations which are generally located in increased distance spaced matrix array. The spaces between the adjacent perforations can be varied as desired. The forward surface of board 1 illustrated in FIGURE 1 has a planar array; however, the back side of the board is provided with a number of protuberances which will now be discussed. A circular ring encircles each perforation and extends rearwardly from the plane of the board as is best illustrated in FIGURE 3 and FIGURE 5. The purpose of ring 3 is to provide additional strength about the perforations in order that they may support heavy weights and the like without danger of the supporting hardware 13 which is inserted in perforation 2 causing breakage or damage to the board. Moreover, the rings 3 protect the board from damage by insertion or removal of the hardware elements 13 as occurs repeatedly during use of the board.

Each board is provided with a peripheral wall 4 which extends about its periphery entirely. The peripheral wall provides additional structural rigidity for the hanger board. Moreover, the peripheral wall is of such a thickness as to prevent viewing of the interior ends of hardware 13 which is inserted into perforation 2. Consequently, an overall appearance of a generally thick board is provided although the entire board is not as thick as the appearance would indicate.

A female cylindrical connector 5 is located adjacent each end of each side of the peripheral wall 4 as shown in FIGURES 3 and 5. Connector 5 is hollow and the adjacent connectors as illustrated in FIGURE 5 are bridged by a male coupling 7 receivable in the interior hollow portion of each connector 5. A recess is provided at 6 in order to enable the insertion of the coupling 7 for connecting adjacent boards 1. Coupling 7 is formed of soft synthetic resin such as soft polyethylene so as to be flexible and elastic to enable the insertion into the female coupling. Once inserted, the coupling 7 remains in place by virtue of its elasticity so that there is no problem with the coupling becoming disconnected from its respective associated board.

Figure 4:
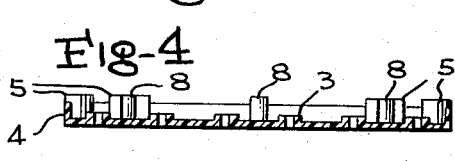
FIGURE 4 is a sectional view taken along lines A-A′ of FIGURE 3.

FIGURES 3 and 4 illustrate another aspect of the invention, namely, a plurality of support lugs 8 extending inwardly from the board 1 to provide an abutting relationship with the supporting wall surface to which the board is attached. Support lugs 8 are of the same height as female connector means 5 and are distributed about the board in order to prevent deflection of the board when pressure is applied to its outside surface. The use of support lugs 8 prevents deflection even when the wall 1 is formed of quite thin material.

Figure 6:
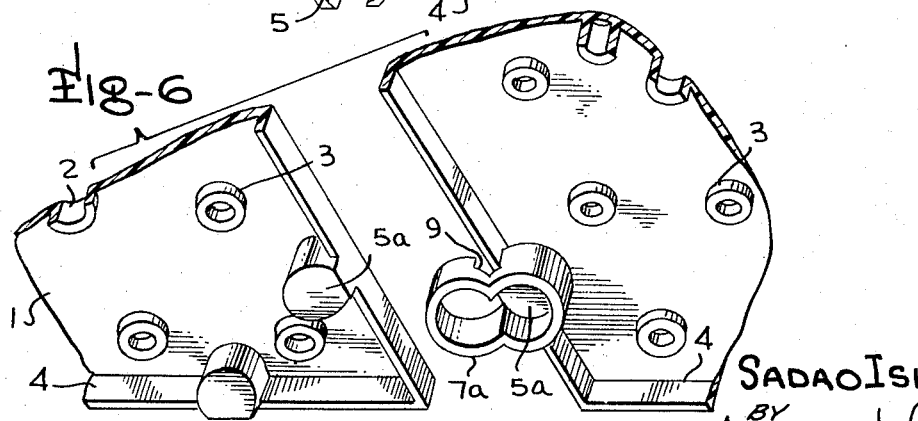
FIGURE 6 is an enlarged perspective view illustrating a second mode of connection between adjacent boards.
Figure 7:
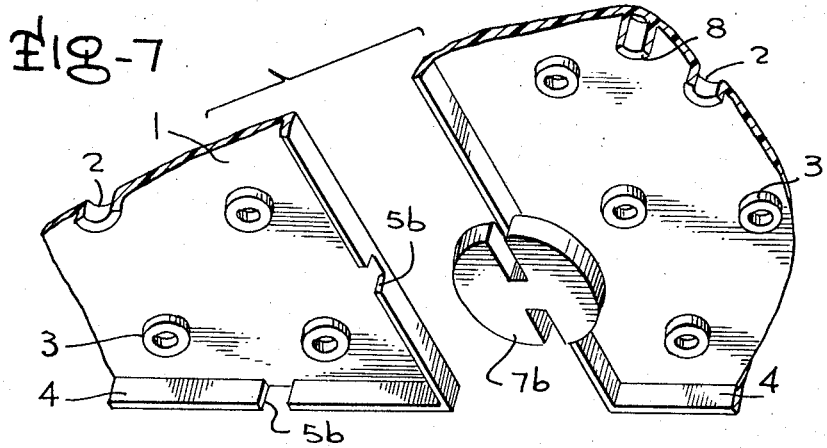
FIGURE 7 is an enlarged perspective view illustrating a third mode of connection between adjacent boards.

FIGURES 6 and 7 illustrate a modified embodiment of the connector means for connecting adjacent board members. In this modification, a solid lug 5a is provided on each of the boards and a hollow bridging connector 7a having a slot 9 at its midpoint bridges the respective adjacent lugs 5a to connect the respective adjacent board elements. Member 7a is of cocoon shape as is previously discussed member 7. The embracing coupling member 7a is tightly fited over each of the elements 5a so as to provide a quickly connectable construction which will remain in connected relation with no danger of inadvertent disconnection taking place. A notch 9 formed in each connector 7a bridges the adjacent peripheral walls 4 in an obvious manner.

FIGURE 7 illustrates yet another modified construction for connecting adjacent board members. The modified embodiment consists of the provision of a slot 5b formed in peripheral wall 4 at each end of each side of the wall. A coupling member 7b formed generally in the shape of the letter H is provided for connecting the adjacent boards in an obvious manner. It should be noted that the portion of the coupling member analogous to the horizontal portion of the H extends through the adjacent slots 5b and the portion analogous to the vertical sides of the letter H are spaced to snugly clamp the adjacent walls 4 together. The connector 7b is dimensioned to snugly engage the associated parts so as to remain in position without any danger of inadvertent removal from connecting relationship.

Figure 8:
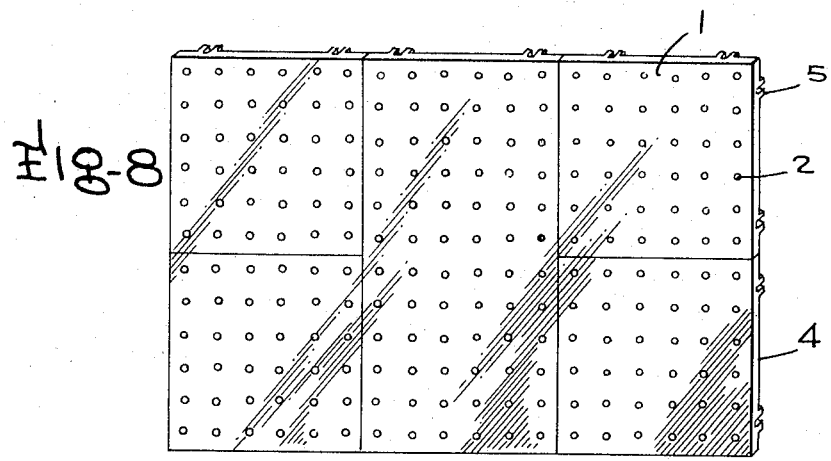
FIGURE 8 is an oblique perspective view illustrating a plurality of boards connected together to form a composite hangerboard construction.

FIGURE 8 illustrates a connection of four sheets of square board connected to a single rectangular sheet. All of the boards can be of the same color if desired; however, boards of different colors can be provided at the option of the user. When boards of different colors are provided, a large variety of constructional aesthetic effects are thereby enabled. Consequently, boards of this type can be employed for interior decoration as well as for the utility aspect of providing a mounting for hanger elements 13 or the like.

Figure 9:
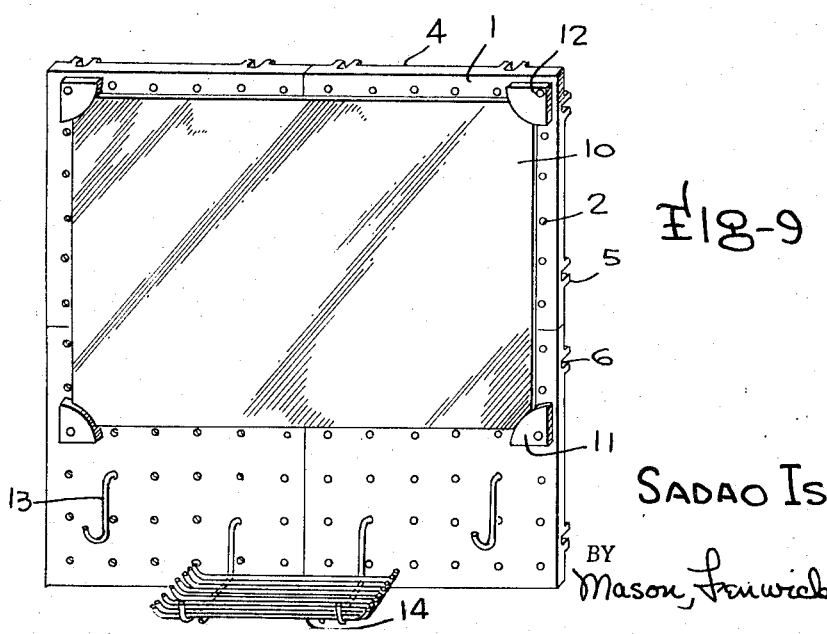
FIGURE 9 is an oblique perspective view of a composite hangerboard construction having mirror mounting hardware and other hardware elements for supporting auxiliary elements.

FIGURE 9 illustrates the manner in which a mirror 10 or other suitable planar elements can be mounted on the hangerboards forming this invention. The member 10 is attached by means of a corner press 11 in the shape of a sector which is in turn attached by a screw 12. Conventional hanger hooks 13 or shelf providing hooks 14 can be inserted in perforations 2 in an obvious manner, as illustrated in FIGURE 9.

It will be evident from the preceding discussion that the present invention provides an extremely useful article of construction which can be mounted in various rooms with a great deal of ease. Moreover, the present invention is economical to construct and is much longer lasting than any of the previously known devices for the same general purpose. There is no problem with the color fading, rot, adhesive deterioration or the other numerous defects of the known prior devices.

Furthermore, the employment of plastic material provides a non-fading color characteristic which is easily cleaned. The fact that the hanger boards 1 can be connected in any desired array provides an extremely versatile convenience. The boards can be provided in any number of sizes or shapes such as squares, rectangles, bilaterally equal triangles or regular hexagons.

Other modifications which will not depart from the spirit and scope of this invention will become apparent to those skilled in the art but it is to be understood that the scope of this invention is defined solely by the appended claims.

I claim:

1. A composite hangerboard construction consisting of a plurality of plastic unit boards with front and rear surfaces and having shapes formed of geometrical elements including at least one straight edge, each unit board also including numerous spaced perforations extending therethrough and the back side of each unit board including a circular ring coaxial with each perforation and extending rearwardly a given amount to provide a reinforced portion adjacent each perforation, a peripheral wall extending about the periphery of each unit board, unitary connector means spaced along said wall, and coupling means extending across the peripheral walls of two adjacent unit boards and engaging said connector means for connecting said two adjacent unit boards by engagement with said adjacent boards and a plurality of support lugs located among said perforations and extending rearwardly from the back side of each of said unit boards with said support lugs extending rearwardly a distance equal to the rearward extension of said connector means.

2. The invention of claim 1 wherein said coupling means comprises a unitary member formed of first and second circular portions respectively received in circular openings adjacent the edge of said adjacent unit boards.

3. The device of claim 1 wherein said coupling means comprises an H-shaped member which is received within first and second aligned slots in the peripheral wall of said adjacent boards.

4. The invention of claim 1 additionally including a mirror attached to the forward side of said boards by means of screws and corner presses associated with said mirror.

5. The device of claim 2 wherein said unit boards are of rectangular configuration.

6. The device of claim 1 wherein said coupling means comprises an 8-shaped connector element having first and second hollow circular end portions engaging generally circular lugs extending from the side of each of said adjacent boards and additionally including a notch into which the peripheral wall of each of said adjacent boards is received.

References Cited

UNITED STATES PATENTS

| | | | |
|---|---|---|---|
| 905,189 | 12/1908 | Hyke | 52—582 |
| 1,040,117 | 10/1912 | Bates | 52—582 |
| 2,132,647 | 10/1938 | Robins | 46—26 |
| 2,551,539 | 5/1951 | Horton | 40—63 |

FRANK DOMOTOR, *Primary Examiner.*

ROY D. FRAZIER, *Assistant Examiner.*

U.S. Cl. X.R.

52—578